(12) United States Patent
Kim et al.

(10) Patent No.: US 12,052,635 B2
(45) Date of Patent: Jul. 30, 2024

(54) METHOD AND DEVICE FOR IDENTIFYING SERVICE AREA IN WIRELESS COMMUNICATION SYSTEM

(71) Applicant: Samsung Electronics Co., Ltd., Suwon-si (KR)

(72) Inventors: Dongyeon Kim, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 284 days.

(21) Appl. No.: 17/667,961

(22) Filed: Feb. 9, 2022

(65) Prior Publication Data

US 2022/0256312 A1 Aug. 11, 2022

(30) Foreign Application Priority Data

Feb. 10, 2021 (KR) .......................... 10-2021-0019225
Apr. 9, 2021 (KR) .......................... 10-2021-0046730

(51) Int. Cl.
*H04W 4/029* (2018.01)
*H04W 4/50* (2018.01)

(52) U.S. Cl.
CPC ............. *H04W 4/029* (2018.02); *H04W 4/50* (2018.02)

(58) Field of Classification Search
CPC ................................ H04W 4/029; H04W 4/50
See application file for complete search history.

(56) References Cited

U.S. PATENT DOCUMENTS 11,558,911 B2 * 1/2023 Kim ..................... H04W 76/11
11,936,756 B2 * 3/2024 Kim ..................... H04L 67/51
(Continued)

FOREIGN PATENT DOCUMENTS

WO 2020/097752 A1 5/2020
WO WO-2023203240 A1 * 10/2023 ......... H04L 41/0806
(Continued)

OTHER PUBLICATIONS

3rd Generation Partnership Project; Technical Specification Group Core Network and Terminals; 5G System; Location Management Services; Stage 3 (Release 16), 3GPP TS 29.572 V16.5.0, Dec. 11, 2020, Sophia Antipolis, France.
(Continued)

*Primary Examiner* — Adam D Houston
(74) *Attorney, Agent, or Firm* — Jefferson IP Law, LLP

(57) ABSTRACT

The disclosure relates to communication techniques for merging $5^{th}$ generation (5G) communication systems with internet-of-things (IoT) technology to support a high data transmission rate in post-$4^{th}$ generation (4G) system and systems therefor. A method performed by a mobility management entity in a wireless communication system is provided. The method includes receiving, from a base station, a first message including first information related to a location of a user equipment (UE); in case that the mobility management entity is not possible to determine whether the location of the UE is included in an area served by the mobility management entity based on the first information, transmitting, to a location management entity, a second message including a parameter associated with the location of the UE; and receiving, from the location management entity, third message including second information indicating an area where the UE belongs, determined based on the parameter.

20 Claims, 9 Drawing Sheets

(56) References Cited

U.S. PATENT DOCUMENTS

| | | | |
|---|---|---|---|
| 11,937,171 B2* | 3/2024 | Cakulev | H04W 4/50 |
| 11,937,314 B2* | 3/2024 | Kim | H04W 76/11 |
| 2005/0273668 A1* | 12/2005 | Manning | H04L 12/66 |
| | | | 714/39 |
| 2009/0116404 A1* | 5/2009 | Mahop | H04L 47/24 |
| | | | 370/254 |
| 2013/0166712 A1* | 6/2013 | Chandramouli | H04L 43/045 |
| | | | 709/223 |
| 2019/0053010 A1 | 2/2019 | Edge et al. | |
| 2020/0267508 A1 | 8/2020 | Fischer et al. | |
| 2023/0354255 A1* | 11/2023 | Kim | H04W 60/04 |
| 2024/0022875 A1* | 1/2024 | Alasti | H04W 36/142 |
| 2024/0080759 A1* | 3/2024 | Gupta | H04W 28/0268 |

FOREIGN PATENT DOCUMENTS

| | | | | |
|---|---|---|---|---|
| WO | WO-2023214383 A1 * | 11/2023 | | H04W 4/029 |
| WO | WO-2023214394 A1 * | 11/2023 | | H04W 12/37 |
| WO | WO-2024026028 A2 * | 2/2024 | | H04W 24/10 |

OTHER PUBLICATIONS

3rd Generation Partnership Project; Technical Specification Group Services and System Aspects; 5G System (5GS) Location Services (LCS); Stage 2 (Release 16), 3GPP TS 23.273 V16.5.0, Dec. 17, 2020, Sophia Antipolis, France.

International Search Report dated May 10, 2022, issued in International Application No. PCT/KR2022/002000.

3rd Generation Partnership Project; Technical Specification Group Services and System Aspects; 5G System (5GS) Location Services (LCS); Stage 2 (Release 16), 3GPP TS 23.273 V16.5.0, Dec. 17, 2020, XP 051975156.

Ericsson, (TP to TS 38.856) Positioning Server Functionality and the NG-RAN, R3-197790, 3GPP TSG-RAN WG3 #106, Nov. 25, 2019, Reno, NV, USA, XP 51831015A.

European Search Report dated Jun. 5, 2024, issued in European Application No. 22752989.8.

* cited by examiner

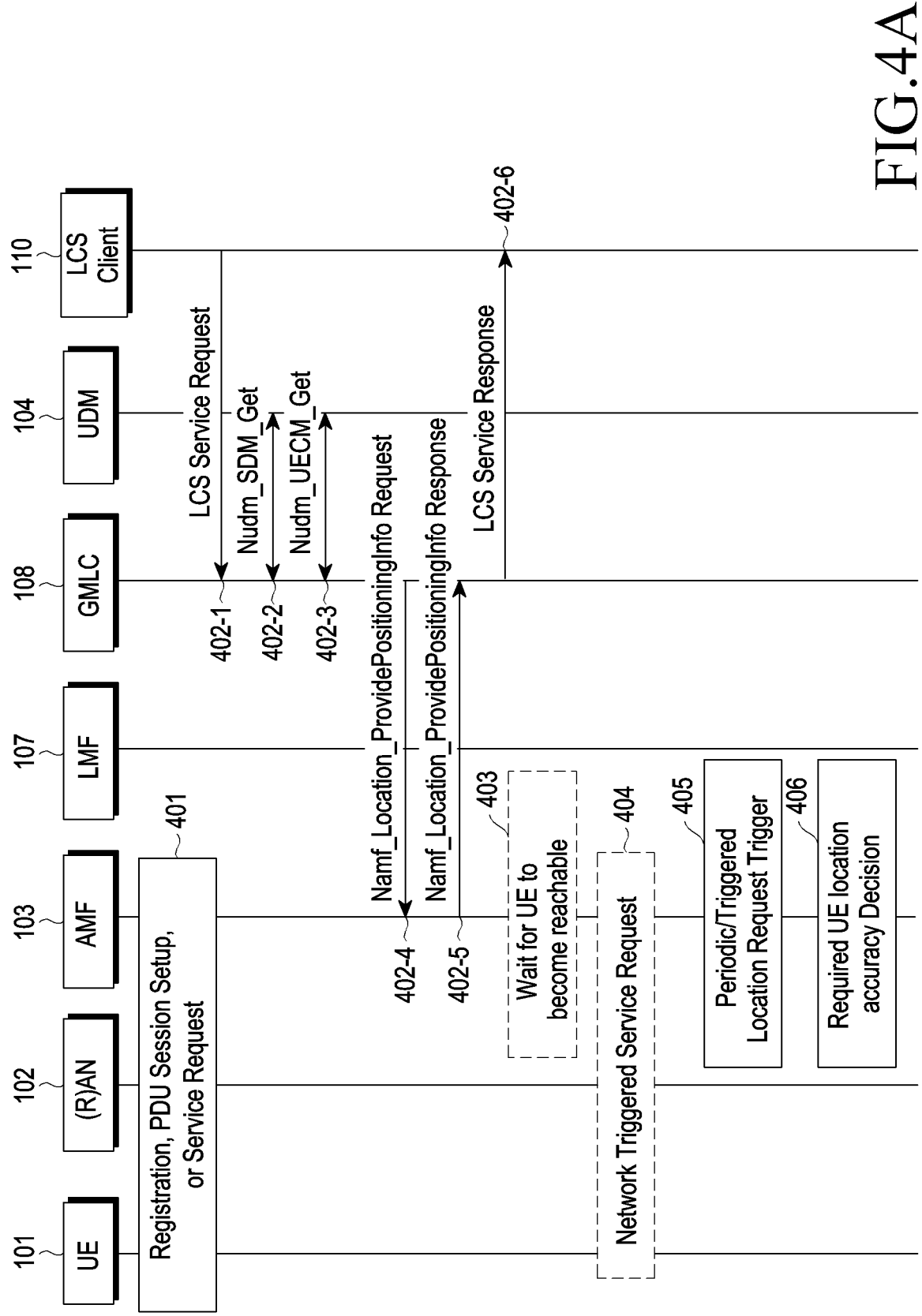

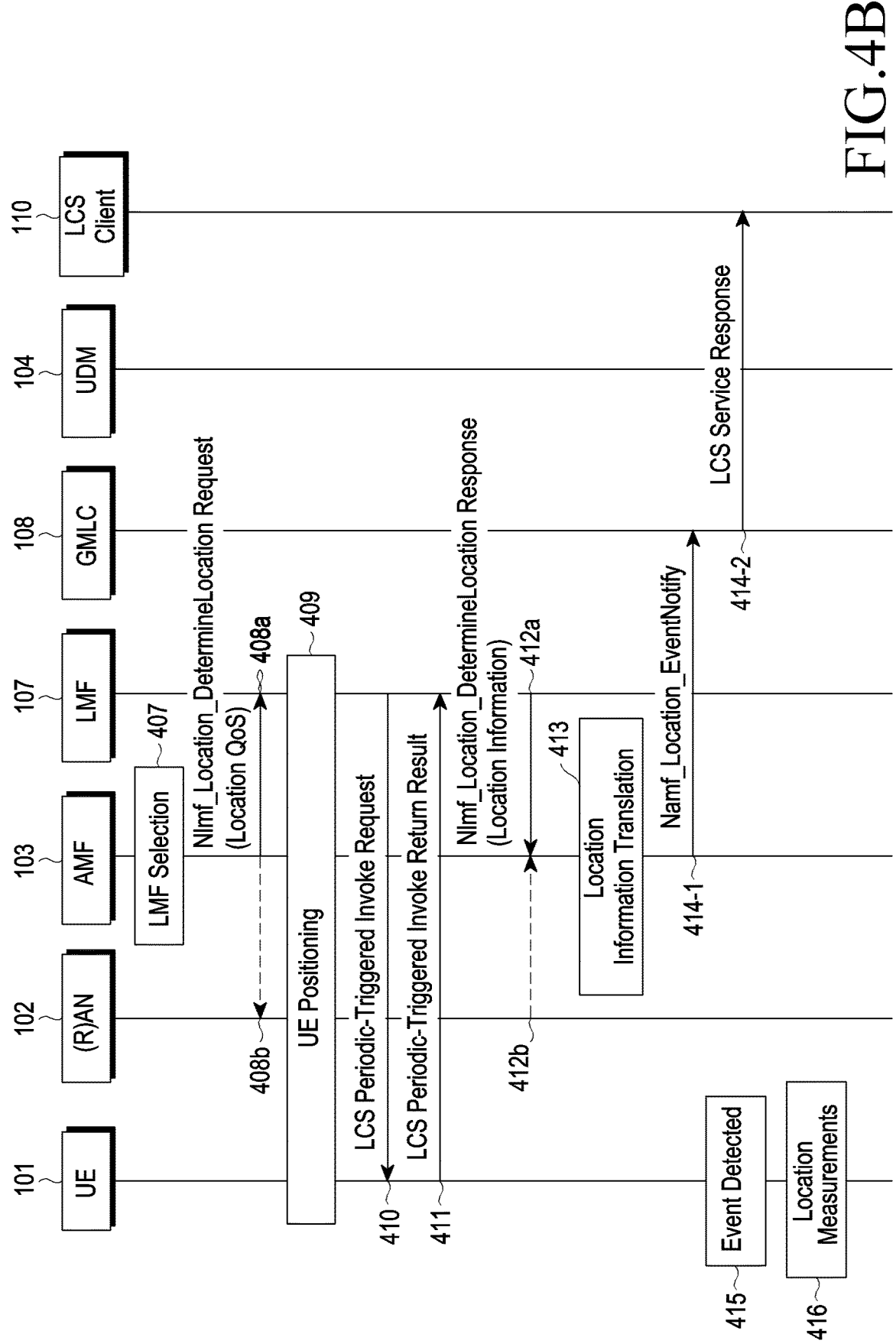

METHOD AND DEVICE FOR IDENTIFYING SERVICE AREA IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0019225, filed on Feb. 10, 2021, in the Korean Intellectual Property Office, and of a Korean patent application number 10-2021-0046730, filed on Apr. 9, 2021, in the Korean Intellectual Property Office, the disclosure of each of which is incorporated by reference herein in its entirety.

BACKGROUND

1. Field

The disclosure relates to a method and a device for identifying a service area in a wireless communication system. More particularly, the disclosure relates to a method for providing appropriate network access based on a service area where a user equipment (UE) belongs in a wireless communication system.

2. Description of Related Art

In order to meet the demand for wireless data traffic soaring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

For higher data transmit rates, 5G communication systems are considered to be implemented on ultra-high frequency bands millimeter wave (mmWave), such as, e.g., 60 GHz. To mitigate pathloss on the ultra-high frequency band and increase the reach of radio waves, the following techniques are taken into account for the 5G communication system, beamforming, massive multi-input multi-output (MIMO), full dimensional MIMO (FD-MIMO), array antenna, analog beamforming, and large scale antenna.

In addition, being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The 5G system considers support for various services as compared with the legacy 4G system. For example, most representative services may include, e.g., enhanced mobile broadband (eMBB), ultra-reliable and low latency communication (URLLC), massive machine-type communication (mMTC), and evolved multimedia broadcast/multicast service (eMBMS). The system providing the URLLC service and the system providing the eMBB service, respectively, may be referred to as a URLLC system and an eMBB system. Further, the terms "service" and "system" may be interchangeably used.

Among them, the URLLC service is a service newly considered in the 5G system unlike in the legacy 4G system and, as compared with the other services, this service requires that ultra-high reliability (e.g., a packet error rate of about 10 to about 5) and low latency (e.g., about 0.5 msec) be met. To meet such strict requirements, the URLLC service may adopt a shorter transmission time interval (TTI) than that of the eMBB service and takes into consideration various operation methods utilizing the same.

The Internet is evolving from the human-centered connection network by which humans create and consume information to the Internet of things (IoT) network by which information is communicated and processed between things or other distributed components. Another arising technology is the Internet of everything (IoE), which is a combination of the Big data processing technology and the IoT technology through, e.g., a connection with a cloud server. To implement the IoT, technology elements, such as a sensing technology, wired/wireless communication and network infra, service interface technology, and a security technology, are required. There is a recent ongoing research for inter-object connection technologies, such as the sensor network, machine-to-machine (M2M), or the machine-type communication (MTC).

In the IoT environment may be offered intelligent Internet technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing information technology (IT) techniques and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network (RAN) as a Big data processing technique may be said to be an example of the convergence of the 5G and IoT technologies.

Advances in satellite communication technology led to efforts to integrate satellite communication technology, which has been in limited use, into a mobile communication network. More particularly, the 3rd generation partnership project (3GPP) is standardizing methods for allowing a UE to connect to a network (e.g., a 5G core network) through a satellite radio access network (satellite RAN).

In the current 3GPP 5G system, mobile communication carriers may provide services to users through terrestrial access networks in a limited area by country or area. An area in which user equipment (UE) is registered with a core network to be managed and controlled for access and mobility is identified as a registration area (RA). An RA may include one or more tracking areas (TAs). The RAN provides radio coverage for one or more cells, and one or more cells may be mapped to one TA. The RAN may identify the current location of the UE by the cell identification (ID). According to national or regional regulations, service areas for most 5G systems including cells, TAs, or RAs prefer a method for indicating an area in a country or region boundary.

On the other hand, a satellite network may provide radio coverage in an area corresponding to one or more countries. Use of such satellite communication technology allows for serving UEs in a plurality of countries with one cell specified in the 3GPP 5G system. In this case, as each country or regions applies different regulations or laws, it is required to be able to provide different methods of exchanging data and control signals between UE and core network. However, the current 3GPP 5G system does not provide a method for controlling access and connection of a UE based on information about the country or region in which the UE and the core network are located.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a device for identifying a service area in a wireless communication system.

Another aspect of the disclosure is to provide a method and a device for precisely identifying a service area where a user equipment (UE) belongs in a wireless communication system.

Another aspect of the disclosure is to provide a method and a device for providing appropriate network access based on a service area where a UE belongs in a wireless communication system.

Another aspect of the disclosure is to provide a method and a device for precisely positioning a UE in the cell covered by a radio access network (RAN) in a wireless communication system.

Another aspect of the disclosure is to provide a method and a device for obtaining the location of a UE in various formats and converting the obtained location format.

Another aspect of the disclosure is to provide a method and a device capable of identifying which country or region the location of a UE is and providing access and connection to a core network located in the country or region.

Additional aspects will be set forth in part in the description which follows and, in part, will be apparent from the description, or may be learned by practice of the presented embodiments.

In accordance with an aspect of the disclosure, a mobility management device in a wireless communication system is provided. The device includes a transceiver and at least one processor configured to control the transceiver. The at least one processor is configured to receive, from a UE, a registration request message including first information related to a location of the UE, in case that an area where the UE belongs is not identifiable based on the first information, transmit, to a location management device, a location determination request message including a parameter indicating the location of the UE, receive, from the location management device, second information indicating the area where the UE belongs, determined based on the parameter, in response to the location determination request message, and transmit, to the UE, a registration reject message including third information indicating the area where the UE belongs, based on the second information in response to the registration request message.

In accordance with another aspect of the disclosure, a UE in a wireless communication system is provided. The UE includes a transceiver and at least one processor configured to control the transceiver. The at least one processor is configured to transmit, to a mobility management device, a registration request message including first information related to a location of the UE and receive, from the mobility management device, a registration reject message including third information indicating an area where the UE belongs, based on second information indicating the area where the UE belongs, in response to the registration request message. The second information is information determined by a location management device, based on a parameter indicating a location of the UE in case that the area where the UE belongs is not identifiable based on the first information by the mobility management device.

In accordance with another aspect of the disclosure, a method performed by a mobility management device in a wireless communication system is provided. The method includes receiving, from a UE, a registration request message including first information related to a location of the UE, in case that an area where the UE belongs is not identifiable based on the first information, transmitting, to a location management device, a location determination request message including a parameter indicating the location of the UE, receiving, from the location management device, second information indicating the area where the UE belongs, determined based on the parameter, in response to the location determination request message, and transmitting, to the UE, a registration reject message including third information indicating the area where the UE belongs, based on the second information in response to the registration request message.

In accordance with another aspect of the disclosure, a method performed by a UE in a wireless communication system is provided The method includes transmitting, to a mobility management device, a registration request message including first information related to a location of the UE and receiving, from the mobility management device, a registration reject message including third information indicating an area where the UE belongs, based on second information indicating the area where the UE belongs, in response to the registration request message. The second information is information determined by a location management device, based on a parameter indicating a location of the UE in case that the area where the UE belongs is not identifiable based on the first information by the mobility management device.

According to the disclosure, a method in which in case that the UE sends a request for connection to the core network through the radio access network, the core network may measure and predict the location of the UE and identify the country or region where the UE is located, rendering it possible to efficiently determine whether it is identical to the country or region where the core network is located and a method in which the core network transfers information about the country or region where the UE is currently located to the core network based on the determination are provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 4A, 4B, and 4C are views illustrating a procedure related to a location request of a user equipment (UE) periodically or by trigger according to various embodiments of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For ease of description, hereinafter, some of the terms and names defined in the 3$^{rd}$ generation partnership project long term evolution (3GPP LTE) standards may be used. However, the disclosure is not limited by such terms and names and may be likewise applicable to systems conforming to other standards.

Figure 1:
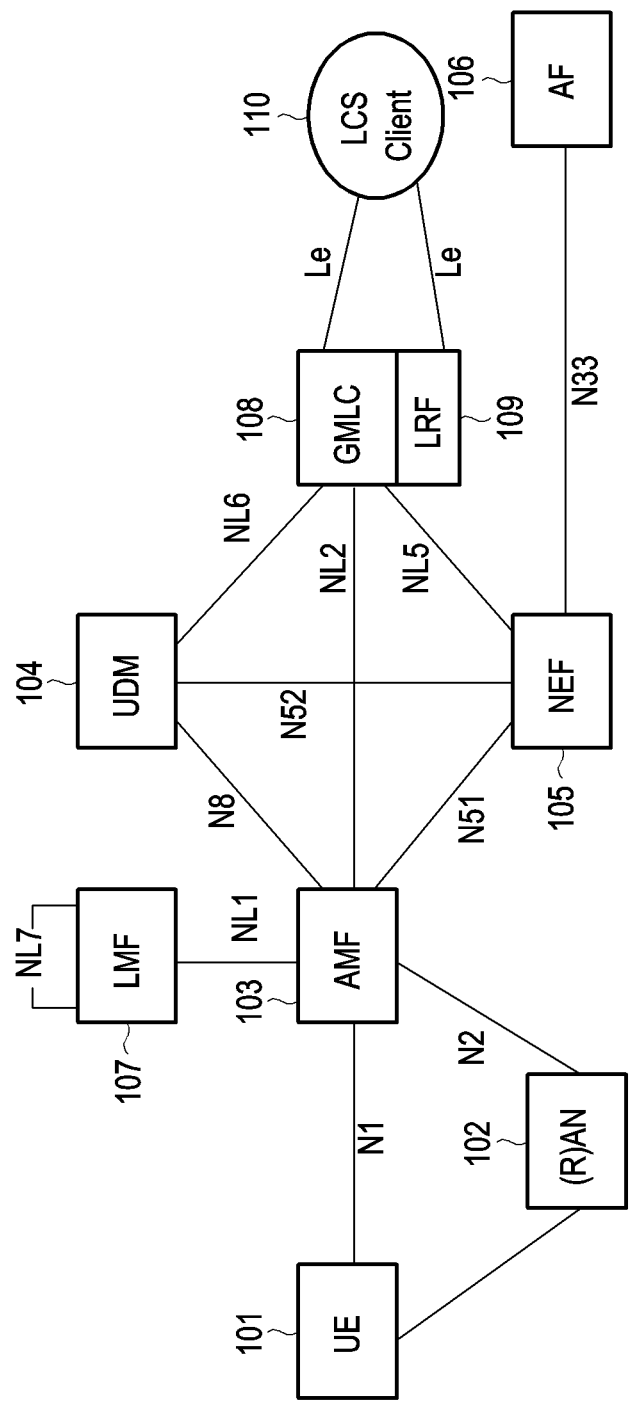
FIG. 1 is a view illustrating a structure of a 5th generation (5G) system for a location service according to an embodiment of the disclosure.

FIG. 1 is a view illustrating a structure of a 5G system for a location service according to an embodiment of the disclosure.

Referring to FIG. 1, a 5G system architecture may include various components (e.g., network functions (NFs)). FIG. 1 illustrates some of the components, e.g., a user equipment (UE) 101, a (radio) access network ((R)AN) 102, an (core) access and mobility management function (AMF) device 103, a unified data management (UDM) device 104, a network exposure function (NEF) device 105, an application function (AF) device 106, a location management function (LMF) device 107, a gateway mobile location center (GMLC) device 108, a location retrieval function (LRF) device 109, and a location service (LCS) client 110.

Each of the devices illustrated in FIG. 1 may be implemented as one server or device or may be implemented as a network slice instance. When implemented as a network slice instance, two or more identical or different network slice instances may be implemented in one server or device, or one network slice instance may be implemented in two or more servers or devices.

Each NF may support the following functions.

The UE 101 may mean a user device. The UE may be referred to as a terminal, mobile equipment (ME), or mobile station (MS). Further, the UE may be a portable device, such as a laptop computer, mobile phone, personal digital assistant (PDA), smartphone, or multimedia device or may be a non-portable device, e.g., a personal computer (PC) or vehicle-mounted device. In the following description, the user device is referred to as user equipment (UE) or terminal.

The (R)AN 102 collectively refers to new radio access technologies that support both E-UTRA (evolved E-UTRA) which is an evolution from 4G radio access technology and new radio access technology (New Radio (NR)) (e.g., gNodeB (gNB)). The RAN 102 may involve processing of various positioning procedures including positioning of a target UE, providing of location-related information not associated with a specific target UE, and transmission of a positioning message between the AMF or LMF and the target UE.

The AMF 103 may provide functions for per-UE access and mobility management and may connect basically to one AMF per UE. Specifically, the AMF 103 may support such functions as inter-CN node signaling for mobility between 3GPP access networks, radio access network (RAN) CP interface (i.e., N2 interface) termination, NAS signaling termination (N1), NAS signaling security (NAS ciphering) and integrity protection, AS security control, registration management (registration area management), connectivity management, idle mode UE reachability (including controlling and performing paging retransmission), mobility management control (subscription and policy), intra-system mobility and inter-system mobility support, support of network slicing, SMF selection, lawful intercept (for interface to AMF event and LI system), transfer of session management (SM) messages between UE and SMF, transparent proxy for SM message routing, access authentication, access authorization including a roaming authority check, transfer of SMS messages between UE and short message service function (SMSF), security anchor function (SEA), and security context management (SCM). All or some of the functions of the AMF 103 may be supported in a single AMF instance operating as one AMF. The AMF 103 may include a function of managing the location of the target UE for all types of location requests. The AMF 103 may access the GMLC and NEF through a Namf interface, the RAN through an N2 reference point, and the UE through an N1 reference point.

The UDM 104 may store, e.g., user's subscription data, policy data. The UDM 104 may store LCS subscriber LCS privacy profile and routing information. The UDM may be accessed from the AMF, GMLC or NEF through the Nudm interface.

The NEF 105 may provide a network capability and an event of another NF connected to the NF to a third party, the AF 106, and an edge computing device (Edge Computing). The NEF may provide a means to access location services via an external AF or internal AF. The AF may use the API to access the location service from the NEF. According to QoS requirements, the NEF may transfer a location request to the GMLC or request event exposure for location information transferred from the AMF or UDM. When event exposure through the AMF is used, the NEF may request routing information and/or target UE personal information from the UDM through the Nudm interface.

The AF 106 may interact with 3GPP core network for providing services (e.g., supporting such functions as application influence on traffic routing, network capability exposure access, and interactions with policy framework for policy control).

The LMF 107 may manage the overall coordination and scheduling of resources required for the location of the UE registered in the core network or accessing the core network. The LMF 107 may calculate or identify final location and velocity estimates and predict the accuracy achieved. The LMF may receive a location request for the target UE from the serving AMF using the Nlmf (or N1) interface. The LMF may interact with the UE to exchange location information applicable to UE assist location methods and UE based location methods and may interact with the RAN 102 to obtain location information. The UE assist location method (or UE assist mode) refers to a method in which the UE obtains a location measurement value and transfers it to another entity (e.g., LMF) so that the entity calculates the location. In the UE-based location method (or UE-based mode) refers to a method in which the UE obtains a location measurement value and then utilizes assistance data provided from a serving public land mobile network (PLMN) to allow the UE to calculate the location estimate. Other applicable modes may include a standalone mode in which after obtaining a location measurement value, the UE independently calculates a measurement estimate without assistance from the serving PLMN and a network-based mode in which the serving PLMN obtaining a location measurement value from the UE calculates a location estimate.

The GMLC 108 corresponds to a first node where the LCS client 110 or the external client 111 may access the core network. The GMLC 108 may include the functions necessary to support the LCS. One PLMN may include one or more GMLCs. The AF 106 and the NF may access the GMLC 108 directly or indirectly through the NEF 105. The GMLC 108 may request routing information and/or target UE privacy information from the UDM 104 through the Nudm interface. The GMLC 108 may perform authentication on the external LCS client 110 or the AF 106 and identify the target UE privacy and then transfer a location request to the serving AMF 103 using the Namf interface or, in the case of a roaming UE, to the GMLC of another PLMN using the Ngmlc interface.

The LRF 109 may be disposed along with the GMLC 108 or in a separate location. The LRF 109 may search for or verify location information. The LRF 109 may provide correlation information and/or routing for the UE which has started an emergency protocol data unit (PDU) session.

The LCS client 110 may interact with the GMLC 108 to obtain location information about one or more UEs. The LCS client 110 may be included in the UE or located outside the UE.

External client 111 collectively refers to devices capable of interacting with the GMLC 108 to obtain location information about one or more UEs through the 5G system from outside of the 3GPP system although not shown in FIG. 1 for clarity of description.

In 3GPP system, a conceptual link connecting between NFs in the 5G system is defined as a reference point. Example reference points included in the 5G system architecture represented in FIG. 1 are provided as follows.

N1: the reference point between the UE and the AMF
N2: the reference point between N2, (R)AN, and AMF
N8: the reference point between the UDM and the AMF
N33: the reference point between the NEF and the AF
N51: the reference point between the AMF and the NEF
N52: the reference point between the UDM and the NEF
NL1: the reference point between the AMF and the LMF
NL2: the reference point between the AMF and the GMLC
NL5: the reference point between the NEF and the GMLC
NL6: the reference point between the UDM and the GMLC
NL7: the reference point between two LMFs
Le: the reference point between the LCS client and the GMLC or the LCS client and the LRF In the following description, terminal may refer to the UE 101, and the terms "UE" and "terminal" may be interchangeably used. In this case, terminal should be appreciated as UE 101 unless defined otherwise.

The network and the core network included in the embodiments of the disclosure may be a concept including a network device. The mobility management device (or mobility management function), the location management device (or the location management function), and the gateway mobile location center may each be configured as separate devices or may be configured to be included in a network device.

Figure 2:
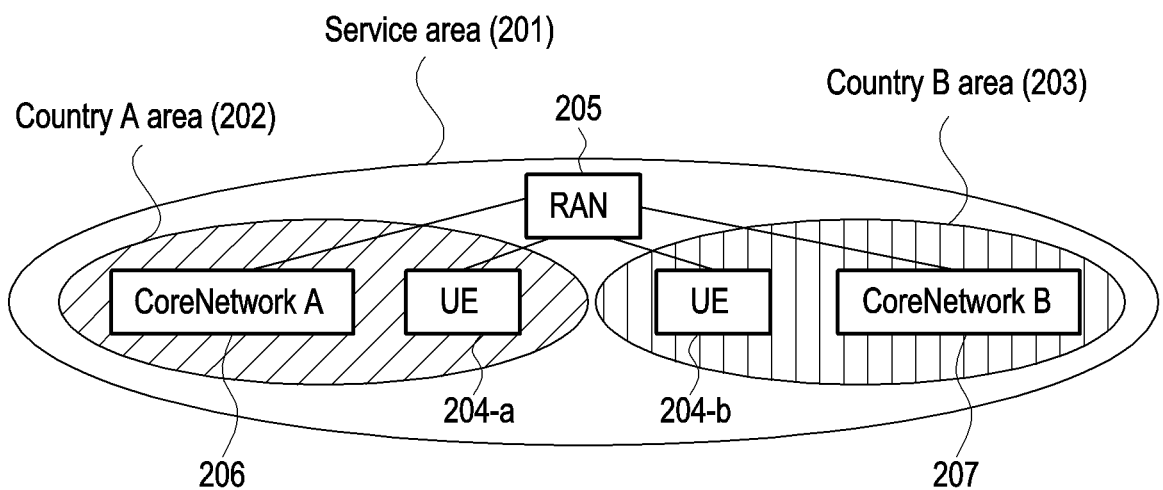
FIG. 2 is a view illustrating a structure of a service area of a 5G system according to an embodiment of the disclosure.

FIG. 2 is a view illustrating a structure of a service area of a 5G system according to an embodiment of the disclosure.

Referring to FIG. 2, a service area 201 corresponds to an area in which a 5G service may be provided through a radio access network (RAN) 205. The service area 201 may include one or more countries or regions. FIG. 2 illustrates an example in which the service area 201 includes two countries according to an embodiment.

Referring to FIG. 2, country A 202 corresponds to the territory of country A. Country B 203 corresponds to the territory of country B. The same may apply to territorial waters or airspace as well as territory, depending on the location where satellite access is provided.

Referring to FIG. 2, when the UE is located within the border of country A, it is denoted as a UE 204-*a* and, when the UE is located within the border of country B, it is denoted as a UE 204-*b*.

Referring to FIG. 2, the RAN 205 corresponds to a network that provides radio access so that the UE may be connected to the core network in the 5G system. As described above in connection with the RAN 102 of FIG. 1, access to E-UTRA and access to NR both may be provided, and NR access may include terrestrial access and satellite access. The RAN 205 may broadcast all ID PLMN IDs accessible in the radio area covered by the RAN 205. The UE may select the PLMN ID with highest priority among the PLMN IDs selectable according to the subscriber information stored in the USIM of the UE or other locations among the PLMN IDs broadcast from the RAN 205 and request the RAN 205 to connect to the core network identified with the corresponding PLMN ID.

Referring to FIG. 2, a core network A 206 means a core network located within the border of country A. A core network B 207 refers to a core network located within the border of country B. The core network A 206 and the core network B 207 may be differentiated by different PLMN IDs.

According to an embodiment of the disclosure, when different regulations need to be applied to country A and country B, a different connectable core network may be selected depending on the current location of the UE. When the current location of the UE is inside country A, the UE 204-*a* may be connected to core network A 206 via the RAN 205, and if it is inside country B, the UE 204-*b* may be connected to core network B 207 via the RAN 205.

According to an embodiment of the disclosure, when the UE 204-*a* located inside country A or the UE 204-*b* located inside country B attempts to connect to the core network A 206 through the RAN 205, the core network A 206 may determine whether the country in which the UE is currently located is the same as the country in which the core network A is located based on information related to the location of the UE. The information related to the location of the UE may include a cell ID, a TA ID, and a gNB ID. If core network A 206 cannot determine the country in which the UE is currently located based on information related to the location of the UE, core network A 206 may send a request for information for measuring and calculating a more precise location to the UE which has requested connection. Core network A 206 may determine the country in which the UE is currently located based on the information for location measurement and calculation received from the UE requesting connection and perform operations (a) to (e) as follows.

(a) When core network A 206 determines that the country in which the UE is currently located is the same as the country in which core network A 206 is located (when the connection requesting UE is the UE 204-*a*) by the above-described method, core network A 206 may allow connection of the UE 204-*a* and perform a registration procedure, PDU session setup procedure, and service request procedure.

(b) When core network A 206 determines that the country in which the UE is currently located is not the same as the country in which core network A 206 is located (when the connection requesting UE is the UE 204-*b*) by the above-described method, core network A 206 may reject connection of the UE 204-*b* and stop a registration procedure, PDU session setup procedure, and service request procedure.

(c) In case (b) above, core network A 206 may reject connection of the UE 204-*b* while simultaneously providing the UE 204-*b* with information about the country (country B) where the UE 204-*b* is located. The country information may include a mobile country code (MCC). The UE 204-*b* may request the RAN 205 to connect to the core network where the UE subscribes in the corresponding country (country B) based on the country information received from core network A 206.

(d) In case (c) above, core network A 206 may provide the UE with information about the country where the UE 204-*b* is located and/or the PLMN ID for the core network subscribed to by the UE in the country where the UE 204-*b* is located.

(e) When core network A 206 determines that the country where the UE is currently located is not the same as the country where core network A 206 is located (when the connection requesting UE is the UE 204-*b*) by the above-described method, core network A 206 may initiate a roaming procedure from the country where the UE 204-*b* is located to the core network (e.g., core network B) where the UE subscribes. In this case, core network A 206 may provide the UE 204-*b* with information about the roaming target core network (in the above-described example, core network B).

Figure 3:
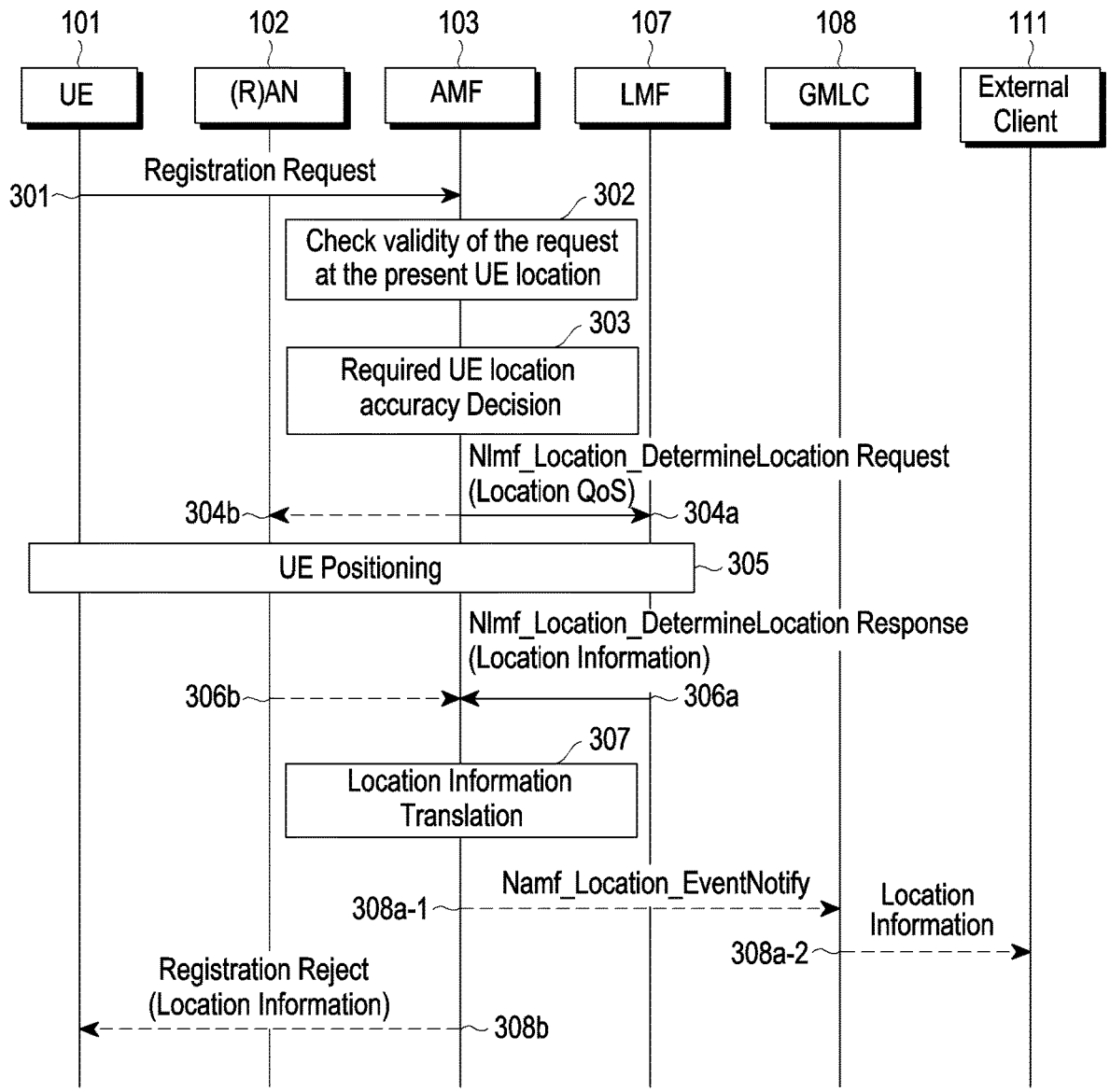
FIG. 3 is a view illustrating a network registration procedure by a UE according to an embodiment of the disclosure.

FIG. 3 is a view illustrating a network registration procedure by a UE according to an embodiment of the disclosure.

Referring to FIG. 3, in operation 301, a UE 101 may transmit a registration request message to the AMF 103 via the RAN 102. The registration request message may include information related to the location of the UE 101. The information related to the location of the UE 101 may include at least one of a cell identifier (cell ID), a tracking area ID (TAI), a gNB ID, and/or location information about the UE 101 provided from a global navigation satellite system (GNSS) or global positioning system (GPS). At least one piece of information related to the location of the UE 101 may be included in the registration request message transmitted by the UE 101 to the RAN 102. When the RAN 102 transfers the registration request message of the UE to the AMF 103, at least one of information related to the location of the UE 101 may be added. The registration request message may be a message related to an emergency service.

In operation 302, when the registration request message is received from the UE 101, the AMF 103 may determine whether the registration request for the UE 101 is valid based on the information related to the location of the UE 101 included in the registration request message. The operation of determining whether the registration request is valid may be the operation of determining whether the location of the UE 101 is included in the service area served by the AMF 103, e.g., a country or region, based on the information related to the location of the UE 101 included in the registration request message. The service area served by the AMF 103 may be determined depending on the physical location or geographical location of the AMF 103. The AMF 103 may compare information related to the location of the UE 101 with information related to the service area served by the AMF 103 and determine whether the location of the UE 101 is included in the service area (e.g., a country or region) served by the AMF 103 based on a result of the comparison. The service area served by the AMF 103 may be determined depending on the physical location or geographical location of the AMF 103. According to an embodiment of the disclosure, the AMF 103 may compare the information related to the location of the UE 101 with the ID of the service area served by the AMF 103, e.g., the MCC value of the PLMN ID, thereby determining whether the area where the UE 101 is located, e.g., a country or region, is identical to the service area indicated by the MCC value, e.g., a country or region. The information related to the location of the UE 101 may include at least one of a cell ID, a tracking area ID (TAI), a gNB ID, and/or location information about the UE 101 provided from a GNSS or GPS. The AMF 103 may identify the service area (e.g., a country or region) where the UE 101 is located based on the information related to the location of the UE (e.g., cell ID, TAI, gNB ID, and/or location information about the UE provided from the GNSS or GPS) and may identify the service area (e.g., a country or region) indicated by the MCC, country name, GPS location information (e.g., GPS coordinates), or PLMN ID based on the MCC, country code, location information provided from the global navigation satellite system (GNSS), location information provided from the global positioning system (GPS), or PLMN ID.

In operation 303, when the AMF 103 is unable to determine whether the service area (e.g., a country or region) where the UE 101 is located is identical to the service area (e.g., a country or region) indicated by the MCC value in operation 302, the AMF 103 may determine the accuracy of the location information about the UE 101, which is information required to indicate the service area (e.g., a country or region) where the UE 101 is located so as to determine whether the service area (e.g., a country or region) where the UE 101 is located is identical to the service area (e.g., a country or region) served by the AMF 103. The service area where the UE 101 is located may be determined depending on the physical location or geographical location of the UE 101. The service area served by the AMF 103 may be determined depending on the physical location or geographical location of the AMF 103. The accuracy of the location information about the UE 101 may include a format for indicating the location of the UE 101. The accuracy of the location information about the UE 101 may be information indicating a parameter or attribute for indicating the location of the UE 101. According to an embodiment of the disclosure, the parameter or attribute may be information indicating MCC, country name, GNSS location information, GPS location information, or PLMN ID. If it is not possible to determine whether the service area where the UE 101 is located is identical to the service area (e.g., a country or region) indicated by the MCC value, such an occasion may be included where the MCC value does not indicate a specific service area (e.g., a country or region). For example, when the MCC value does not indicate a specific service area may include when one country is able to use several MCC values (e.g., the U.S. may use 310 to 316, and each of such MCC values may be, or may not be, mapped to a specific region in the country) or when the MCC value may be commonly used regardless of country (some MCC values, e.g., 901, may be used by a satellite network operator regardless of the service country or may be used when the mobile communication operator tests a new mobile communication system). The accuracy of the location information about the UE 101 (or the parameter or attribute for indicating the location of the UE), which is information required to indicate the service area (e.g., a country or region) where the UE 101 is located may include (f) to (j) below.

(f) MCC (e.g., 310 to 316 for the United States, 450 for Korea)
(g) Country name (e.g., US, KR, DE, etc.)
(h) GPS location information and/or GNSS location information
(i) PLMN ID
(j) a combination of all or some of (f) to (i) above Operation 303 may be performed by the LMF 107 according to other policies, such as system management. In this case, the AMF 103 may transfer, to the LMF 107, the information related to the location of the UE 101 received from the UE 101 and the RAN 102 in operation 301 and/or information about the service area served by the AMF 103, e.g., PLMN ID (or MCC), after operation 302.

In operation 304a, the AMF 103 may transmit a UE 101 location determination request (or location determination request) message to the LMF 107. The UE 101 location determination request message may include the accuracy of location information about the UE 101 which is information required to indicate the service area (e.g., a country or region) where the UE 101 is located, determined in operation 303. The UE 101 location determination request message may include location quality-of-service (QoS) information. The accuracy of location information about the UE 101, which is information required to indicate the service area (e.g., a country or region) where the UE 101 is located may be included as one of the location QoS information. The location QoS information may include at least one of an LCS QoS class (best effort class or assured class), accuracy of UE location information, or response time.

In operation 305, the LMF 107 may communicate with (access) the UE 101 through the AMF 103 and the RAN 102 based on the information included in the UE location determination request message received in operation 304a, thereby measuring and calculating the location of the UE 101. The location of the UE 101 may be measured and calculated based on the accuracy of the location information about the UE 101. The location of the UE 101 may be measured and calculated based on the parameter or attribute included in the accuracy of the location information about the UE 101. For example, when the accuracy is included in the GPS location information (e.g., GPS coordinates), the LMF 107 may measure and calculate the location of the UE 101 as GPS location information (e.g., GPS coordinates). The measurement and calculation of location may be performed by the LMF 107 or UE 101 according to the location information determination method described above in connection with FIG. 1.

In operation 306a, the LMF 107 may transmit, to the AMF 103, a response message including the location information about the UE 101 obtained in operation 305 (the location information about the UE 101 may be information indicating the service area where the UE 101 belongs). The response message may be a location determination response message for the location determination request message. In this case, the format of the location information about the UE 101 may be a format corresponding to the format included in the accuracy requested by the AMF 103 in operation 304a. For example, when the accuracy includes GPS location information, the location information about the UE 101 transmitted to the AMF 103 may be a GPS location information format.

Operations 304a to 306a may be replaced by a procedure (304b and 306b) in which when the RAN 102 is able to provide the location information about the UE 101, the AMF 103 transmits a location determination request message to the RAN 102, not the LMF 107, and receive the location information about the UE 101, depending on the determination of the AMF 103.

According to an embodiment of the disclosure in which the AMF 103 transmits a location determination request message to the RAN 102, not the LMF 107, and receives location information about the UE 101, if the information related to the location of the UE 101 received by the AMF 103 in operation 301 does not include GNSS location information, and the accuracy of location information about the UE 101 determined in operation 303 is GNSS location information, and GNSS location information is information obtainable from the RAN 102 as a result of determining using the information related to the RAN 102 and/or the gNB ID, the AMF 103 may transmit, to the RAN 102, the UE 101 location determination request message described above in connection with operation 304*a* (304*b*). The UE 101 location determination request message may include the accuracy of location information about the UE 101 which is the information required to indicate the service area (e.g., a country or region) where the UE 101 is located, determined in operation 303. The UE 101 location determination request message may include location quality-of-service (QoS) information. The accuracy of location information about the UE 101, which is information required to indicate the service area (e.g., a country or region) where the UE 101 is located may be included as one of the location QoS information. The location QoS information may include at least one of an LCS QoS class (best effort class or assured class), accuracy of UE location information, or response time. The RAN 102 may obtain GNSS location information about the UE 101 using GNSS and this may replace operation 305. The RAN 102, which receives the UE 101 location determination request message from the AMF 103, may transmit, to the AMF 103, a response message including the location information about the UE 101 described above in connection with operation 306*a* (the location information about the UE 101 may be information indicating the service area where the UE 101 belongs) (306*b*). For example, the response message may include the GNSS location information about the UE 101 obtained using GNSS and be transmitted to the AMF 103. The response message may be a location determination response message for the location determination request message. In this case, the format of the location information about the UE 101 may be a format corresponding to the format included in the accuracy requested by the AMF 103 in operation 304*a*.

In the procedure of receiving location information about the UE 101 from the RAN 102 instead of operations 304*a* to 306*a*, the AMF 103 may include a location reporting level or information about the location reporting level in the UE 101 location determination request message described above in connection with operation 304*a* and transmit it to the RAN 102. The location reporting level (or information about the location reporting level) may include a TAI, cell ID, GPS information, and/or GNSS information. The AMF 103 may include a reporting type or information about the reporting type in the location determination request message. The reporting type may include information for instructing to report location information about the UE, once and/or when a location change corresponding to the location reporting level (information about the location reporting level) occurs (e.g., when GNSS information about the UE 101 is changed). If the reporting type is indicated as an occasion where a location change corresponding to the location reporting level occurs, even after the UE 101 successfully finishes a registration procedure, the RAN 102 may transmit, to the AMF 103, a response message for the location determination request including the location information about the UE 101 when a change in the location information about the UE 101 occurs. In this case, the AMF 103 may proceed with operations 307 and 308 described below.

The procedure 304*b* and 306*b* in which the AMF 103 receives location information about the UE 101 from the RAN 102 in place of operations 304*a* to 306*a* may be a similar scheme to the NG-RAN location report procedure in 3GPP TS 23.502. The NG-RAN location report procedure may be as follows. The AMF 103 may transmit a location reporting control message to the RAN 102. The location reporting control message may include the location reporting level and the reporting type. The RAN 102 may transmit a location report message in response to the location reporting control message. The location report message may include the location information about the UE 101. The RAN 102 may continuously transmit the location report message to the AMF 103 according to the location reporting type. The AMF 103 may transmit a cancel location report message to the RAN 102. Upon receiving the location report message, the RAN 102 may not transmit the location report message.

In operation 307, the AMF 103 may determine whether to convert the location information about the UE 101, received from the LMF 107 (or from the RAN 102), into information in a format processable by the UE 101 in operation 301 and/or 306 (306*a* and 306*b*). The location information types processable by the UE 101 may include MCC, cell ID, TAI, gNB ID, and/or country name. When it is determined that conversion of information type is needed, the AMF 103 may convert the location information about the UE 101, received from the LMF 107 (or from the RAN 102) and/or in operation 301, into information in a format processable by the UE 101. Types of schemes for converting the type of location information may include (k) to (m) below.

(k) conversion of GPS location information or/and GNSS location information into MCC value (l) conversion of country name into MCC value (m) conversion of PLMN ID into MCC value (since PLMN ID is a combination of MCC and MNC, it may be a scheme of extracting MCC value). Operation 307 may be performed regardless of the result of determination by the AMF 103 as to whether the registration request for the UE 101 is valid in operation 302. According to an embodiment of the disclosure, if the location information about the UE 101 received in operation 301 includes GNSS location information about the UE 101, and the registration request for the UE 101 is determined to be valid in operation 302, the AMF 103 may determine whether the GNSS location information about the UE 101 is information in a format processable by the UE 101 in operation 307. If the GNSS location information about the UE 101 received in operation 301 is added by the RAN 102 transferring the registration request message, the AMF 103 may determine to convert the GNSS location information into an MCC value. Without being limited thereto, it may be applied to all of the above-described location information types.

According to an embodiment of the disclosure, the AMF 103 may map the country name, GPS location information, GNSS location information, or PLMN ID to correspond to the location information about the UE 101 (cell ID, TAI, gNB ID, GPS location information or GNSS location information) or MCC and may convert the type of location information about the UE 101 through the mapping information. When it is determined that conversion of information type is not necessary (when the type of the location information about the UE 101 received is MCC according to an embodiment), operation 307 may be omitted.

According to another embodiment of the disclosure, operation 307 may be performed by the LMF 107 according to other policies, such as system management. In this case, after performing operation 307 immediately after operation 305, the LMF 107 may include the converted location information about the UE 101 in a response message corresponding to operation 306*a*.

According to another embodiment of the disclosure, if operations 304*a* to 306*a* are replaced with the procedure (304b and 306b) in which the AMF 103 requests the RAN 102, not the LMF 107, to receive the location information about the UE 101 according to the determination of the AMF 103, operation 307 may be performed by the RAN 102 according to other policies, such as system management. In this case, the RAN 102 may include the converted location information about the UE 101 in the response message corresponding to operation 306a. After operation 307, the AMF 103 may determine whether it is possible to connect to the network (e.g., core network) through the AMF 103 in the service area (e.g., a country or region) where the UE 101 is located based on the location information about the UE 101 converted in operation 307, and/or the location information about the UE 101 received from the RAN 102 and/or the LMF 107 in operation 306a. If it is determined that it is connectable to the network through the AMF 103, the remaining registration procedure and PDU session setup procedure may continuously be performed. (The registration procedure may be a registration procedure according to a standard. The PDU session setup procedure may be a protocol data unit (PDU) session setup procedure according to a standard.) If it is determined that the network cannot be connected through the AMF 103, in operation 308b, the AMF 103 may transmit a message to reject the registration request to the UE 101. The message to reject the registration request may include information (n) to (p) below.

(n) Reason for rejection to inform that 'cannot be registered in the network at the location of the UE'
(o) Position information indicating the service area (e.g., a country or area) in which the UE is located, obtained in operation 305 or 307 (the location information may be information converted into information in a format processable by the UE)
(p) a combination of all or some of (n) to (o) above Upon receiving the message to reject the registration request including the information (n) to (p) above, the UE 101 and/or the RAN 102 may perform PLMN selection again by referring to the information included in the message.

In relation to operation 308b, according to an embodiment of the disclosure, the UE 101 receiving the registration request rejection message from the AMF 103 may perform PLMN selection again by referring to the information (n) to (p) included in the message.

According to another embodiment of the disclosure, when the AMF 103 transmits the registration request rejection message, the RAN 102 may request the UE 101 to perform PLMN selection again by referring to the information (n) to (p) included in the message.

According to another embodiment of the disclosure, when the AMF 103 transmits the registration request rejection message, the AMF 103 may request the RAN 102 to perform PLMN selection again by referring to the information (n) to (p) included in the message. The RAN 102 may inform the UE 101 of information about the selected PLMN, and the UE 101 may select the PLMN selected by the RAN 102 and transmit a registration request message to the core network. In this case, operation 301 and its subsequent operations may be performed again with the selected PLMN. Alternatively, the RAN 102 may hand over the existing registration request to the core network belonging to the selected PLMN.

If it is determined that connection to the network through the AMF 103 is possible, the AMF 103 may transmit the information (o) to the UE 101 and/or the RAN 102 (not shown). The UE 101 and/or the RAN 102 that has received the information (o) may refer to the information (o) when performing a mobility management procedure and a session management procedure that occurs later. The mobility management procedure may include a deregistration procedure, and the session management procedure may include a service request procedure and a PDU session release procedure (network initiated PDU session release procedure).

According to an embodiment of the disclosure, the AMF 103 may include the information (o) when transmitting a message (e.g., a registration accept message) informing the UE 101 of acceptance of the registration request.

When the registration request of the UE 101 in operation 301 is a request for an emergency service, after operations 301 to 307, the AMF 103 may transfer the location information about the UE 101, obtained in operation 305 or 307, to the external client 111 through the GMLC 108 in operations 308a-1 to 308a-2.

Figure 4C:
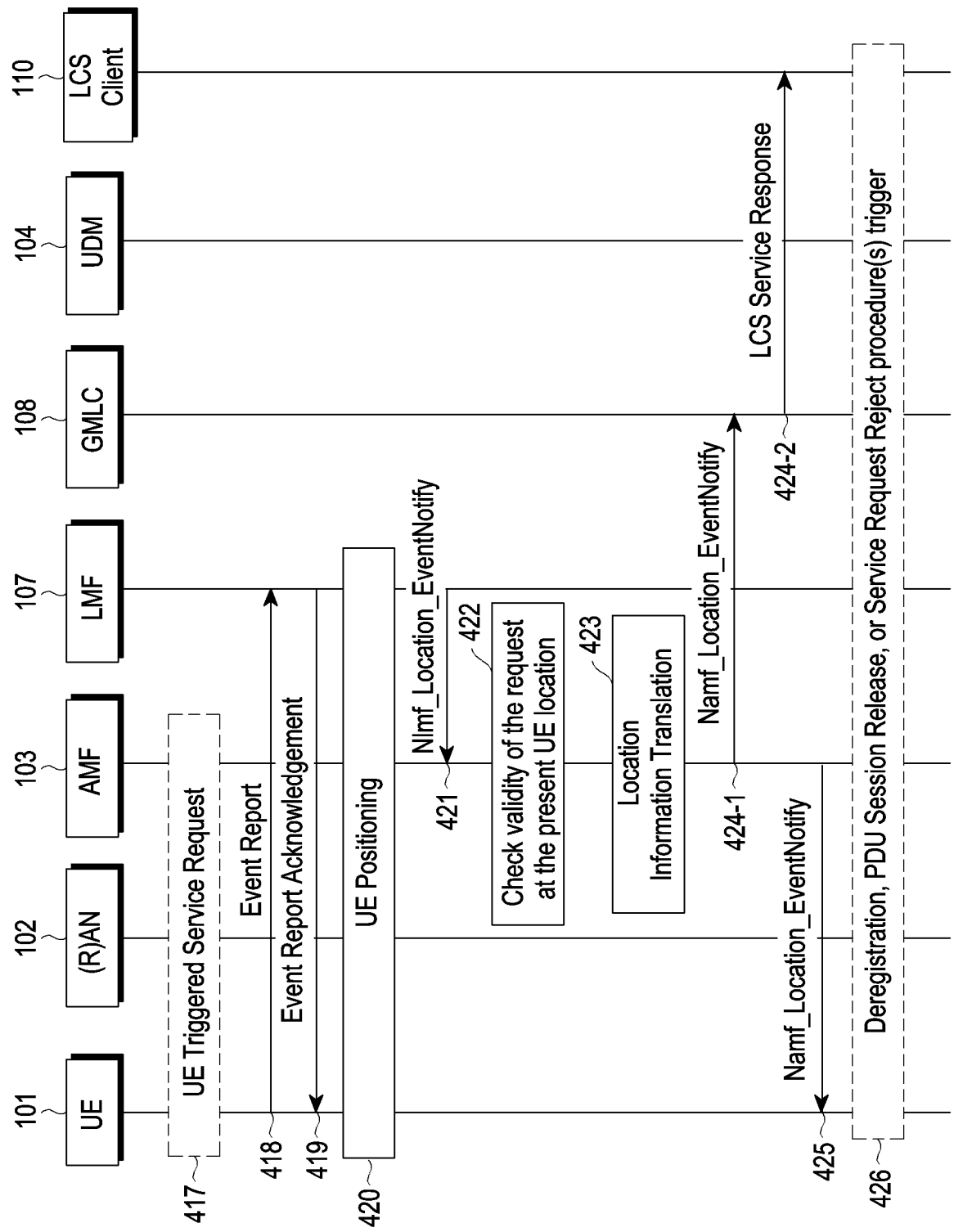

FIGS. 4A, 4B, and 4C are views illustrating a procedure related to a location request of a UE periodically or by trigger according to various embodiments of the disclosure.

Referring to FIGS. 4A, 4B, and 4C, in operation 401, the UE 101, the RAN 102, or the AMF 103 may initiate a registration procedure, a PDU session setup or modification procedure, or a service request procedure according to an embodiment of FIG. 3.

In operation 402-1, the LCS client 110 may transmit a message (according to an embodiment of the disclosure, an LCS service request message) for requesting to provide an LCS service to the network (a core network according to an embodiment) through the GMLC 108. The LCS service request message may include a time interval to receive the location information about the UE 101 and trigger information indicating the event to receive the location information about the UE 101.

In operation 402-2, the GMLC 108 may obtain information for identifying whether the LCS client 110 making the LCS service request subscribes to the LCS service in operation 402-1 from the UDM 104 and may identify that the LCS service request of the LCS client 110 is valid through the information for identifying whether it subscribes to the LCS service.

In operation 402-3, the GMLC 108 may request information for accessing (reaching) the AMF 103 and receive it from the UDM 104. The information for accessing (reaching) the AMF 103 may include an AMF 103 address.

In operation 402-4, the GMLC 108 may transmit a message to send a request for the location information about the UE 101 to the AMF 103 based on the information included in the LCS service request message received from the LCS client 110 in operation 402-1 and the information for accessing (reaching) the AMF 103 received from the UDM 104 in operation 402-3.

In operation 402-5, the AMF 103 may transmit, to the GMLC 108, a message (according to an embodiment of the disclosure, a response message to the message for requesting the location information about the UE 101) to acknowledge reception of the request in operation 402-4.

In operation 402-6, the GMLC 108 may transfer, to the LCS client 110, acknowledgment information received from the AMF 103 in operation 402-5. The acknowledgment information may be included in the LCS service response message to the LCS service request message in operation 402-1.

In operation 403, the AMF 103 may wait until the LCS service target UE 101 enters an accessible (reachable) state. The LCS service target UE 101 may be a UE 101 whose location information is requested by the LCS client 110.

In operation 404, when the LCS service target UE 101 is in CM-IDLE state, the AMF 103 may perform a network triggered service request procedure by the network.

In operation 405, the AMF 103 may determine whether to initiate subscription to periodical or trigger-based reception of UE location information based on information indicating a condition for receiving the location information about the UE, e.g., (q) to (s) below, or upon receiving the LCS service request in operation 402-4.
  (q) When the 5G service that may be provided may be changed according to the location of the UE 101
  (r) When the UE 101 accesses the RAN 102 by a satellite radio access technology
  (s) When 5G service may be provided only when the service area (e.g., a country or area) where the UE 101 is located is identical to the service area (e.g., a country or area) where the AMF 103 is located The condition for receiving the location information about the UE 101 may include duration which is information indicating a period. The duration may be predetermined with the formation of the network or LCS service or may be set by the user.

In operation 406, the AMF 103 may determine the accuracy of the location information about the UE 101 based on the condition for receiving the location information about the UE 101 determined in operation 405. The accuracy of the location information about the UE 101 may include a format for indicating the location of the UE 101. The accuracy of the location information about the UE 101 may be information indicating a parameter or attribute for indicating the location of the UE 101. According to an embodiment of the disclosure, the parameter or attribute may be information indicating MCC, country name, GPS location information, GNSS location information, or PLMN ID. Operation 406 may be performed by the LMF 107 according to other policies, such as system management. The accuracy of the location information about the UE 101 may include at least one of MCC, country name, GPS location information, GNSS location information, or PLMN ID.

In operation 407, the AMF 103 may perform an LMF selection operation based on the accuracy of the location information about the UE 101, determined in operation 406 and the condition for receiving the location information about the UE 101 determined in operation 405. For example, when the type of the accuracy of the location information about the UE 101 determined in operation 406 is GPS location information, an LMF capable of measuring or calculating the GPS location information about the UE 101 may be selected.

In operation 408a, the AMF 103 may transmit a UE 101 location determination request message, including the accuracy of the location information about the UE 101 determined in operation 406 and the condition for receiving the location information about the UE 101 determined in operation 405, to the LMF 107 selected in operation 407. The UE 101 location determination request message may include location quality-of-service (QoS) information. The accuracy of location information about the UE 101, which is information required to indicate the service area where the UE 101 is located may be included as one of the location QoS information. The location QoS information may include at least one of an LCS QoS class (best effort class or assured class), accuracy of UE location information, or response time.

Operation 408a may be replaced by a procedure (408b and 412b) in which when the RAN 102 is able to provide the location information about the UE 101, the AMF 103 transmits a location determination request message to the RAN 102, not the LMF 107, and receive the location information about the UE 101, depending on the determination of the AMF 103. The AMF 103 may include a location reporting level or information about the location reporting level in the UE 101 location determination request message described above in connection with operation 304a and transmit it to the RAN 102. The location reporting level may include TAI, cell ID, GPS information, and/or GNSS information. The AMF 103 may include a reporting type or information about the reporting type in the location determination request message. The reporting type may include information for instructing to report location information about the UE, once and/or when a location change corresponding to the location reporting level (information about the location reporting level) occurs (e.g., when GNSS information about the UE 101 is changed). For example, when the information related to the location of the UE 101 received by the AMF 103 does not include GNSS location information, and the determined accuracy of the location information about the UE 101 is the GNSS location information, and GNSS location information is information obtainable from the RAN 102 as a result of determination using the gNB ID and/or the information related to the RAN 102, the AMF 103 may transmit, to the RAN 102, a UE 101 location determination request message described in connection with operation 304a.

In operation 409, the LMF 107 may communicate with (access) the UE 101 through the AMF 103 and the RAN 102 based on the information included in the UE location determination request message received in operation 408a, thereby measuring and calculating the location of the UE 101. The location of the UE 101 may be measured and calculated based on the accuracy of the location information about the UE 101. The location of the UE 101 may be measured and calculated based on the parameter or attribute included in the accuracy of the location information about the UE 101. For example, when the accuracy is included in the GPS location information, the LMF 107 may measure and calculate the location of the UE 101 as GPS location information. The measurement and calculation of location may be performed by the LMF 107 or UE 101 according to the location information determination method described above in connection with FIG. 1.

In place of operation 409, when the AMF 103 transmits the location determination request message to the RAN 102, not the LMF 107, according to the determination of the AMF 103 in operation 408a (408b), the RAN 102 may obtain the location information about the UE 101. For example, the RAN 102 may obtain GNSS location information about the UE 101 using the GNSS.

In operation 410, the LMF 107 may transmit, to the UE 101, a message to request to initiate subscription for receiving UE location information periodically or by trigger. The request message may be an LCS periodic-triggered invoke request message. The message to request to initiate subscription for receiving the location information about the UE 101 may include the condition for receiving the location information about the UE 101 received from the AMF 103 in operation 408 (408a and 408b).

In operation 411, the UE 101 may transmit, to the LMF 107, a message to acknowledge reception of the request to initiate subscription for receiving the location information about the UE 101 in operation 410. The acknowledgment message may be an LCS periodic-triggered invoke return result message.

In operation 412a, the LMF 107 may transmit, to the AMF 103, a response message including the location information about the UE 101 obtained in operation 409. The response message may be a location determination response message for the location determination request message. In this case, the format of the location information about the UE 101 may be a format corresponding to the format included in the accuracy requested by the AMF 103 in operation 408. For example, when the accuracy includes GPS location information, the location information about the UE 101 transmitted to the AMF 103 may be a GPS location information format.

In place of operation 412a, when the AMF 103 transmits, to the RAN 102, not the LMF 107, the location determination request message according to the determination of the AMF 103 in operation 408a (408b), the RAN 102 receiving the UE 101 location determination request message from the AMF 103 may transmit, to the AMF 103, a response message including the location information about the UE 101 described above in connection with operation 412a (the location information about the UE 101 may be information indicating the service area where the UE 101 belongs) (412b). For example, the response message may include the GNSS location information about the UE 101 obtained using GNSS and be transmitted to the AMF 103. The response message may be a location determination response message for the location determination request message. In this case, the format of the location information about the UE 101 may be a format corresponding to the format included in the accuracy requested by the AMF 103 in operation 408a.

In the procedure of receiving location information about the UE 101 from the RAN 102 instead of operations 408a, 409, and 412a, the AMF 103 may include a location reporting level or information about the location reporting level in the UE 101 location determination request message described above in connection with operation 408a and transmit it to the RAN 102. The location reporting level (or information about the location reporting level) may include a TAI, cell ID, GPS information, and/or GNSS information. The AMF 103 may include a reporting type or information about the reporting type in the location determination request message. The reporting type may include information for instructing to report location information about the UE, once and/or when a location change corresponding to the location reporting level (information about the location reporting level) occurs (e.g., when GNSS information about the UE 101 is changed). If the reporting type is indicated as an occasion where a location change corresponding to the location reporting level occurs, even after the UE 101 successfully finishes a registration procedure, the RAN 102 may transmit, to the AMF 103, a response message for the location determination request including the location information about the UE 101 when a change in the location information about the UE 101 occurs. In this case, the AMF 103 may proceed with operation 413 and its subsequent operations described below.

The procedure in which the AMF 103 receives location information about the UE 101 from the RAN 102 in place of operations 408a, 409, and 412a may be a similar scheme to the NG-RAN location report procedure in 3GPP TS 23.502. The NG-RAN location report procedure may be as follows. The AMF 103 may transmit a location reporting control message to the RAN 102. The location reporting control message may include the location reporting level and the reporting type. The RAN 102 may transmit a location report message in response to the location reporting control message. The location report message may include the location information about the UE 101. The RAN 102 may continuously transmit the location report message to the AMF 103 according to the location report type. The AMF 103 may transmit a cancel location report message to the RAN 102. Upon receiving the location report message, the RAN 102 may not transmit the location report message.

In operation 413, the AMF 103 may determine whether to convert the location information about the UE 101, received from the LMF 107 (or from the RAN 102), into information in a format processable by the UE 101 in operation 412 (412a and 412b). MCC may be included in the type of location information processable by the UE 101. When it is determined that conversion of information type is needed, the AMF 103 may convert the location information about the UE 101, received from the LMF 107 (or from the RAN 102), into information in a format processable by the UE 101. The AMF 103 may map the country name, GPS location information, GNSS location information, or PLMN ID to correspond to the location information about the UE 101 (cell ID, TAI, gNB ID, GPS location information or GNSS location information) or MCC and may convert the type of location information about the UE 101 through the mapping information. If it is determined that the information type conversion is not necessary, operation 413 may be omitted. For conversion, a method similar to the conversion method applied in operation 307 of FIG. 3 may be used.

In operation 413, according to an embodiment of the disclosure, if the received location information about the UE 101 includes GNSS location information about the UE 101, and the registration request for the UE 101 is determined to be valid, the AMF 103 may determine whether the GNSS location information about the UE 101 is information in a format processable by the UE 101 in operation 413. If the received GNSS location information about the UE 101 is added by the RAN 102 transferring the registration request message, the AMF 103 may determine to convert the GNSS location information into an MCC value. Without being limited thereto, it may be applied to all of the above-described location information types.

According to another embodiment of the disclosure, operation 413 may be performed by the LMF 107 according to other policies, such as system management. In this case, after performing operation 413 immediately after operation 409, the LMF 107 may include the converted location information about the UE 101 in a response message corresponding to operation 412a.

According to another embodiment of the disclosure, if operations 408a, 409, and 412a are replaced with the procedure in which the AMF 103 requests the RAN 102, not the LMF 107, to receive the location information about the UE 101 according to the determination of the AMF 103, operation 413 may be performed by the RAN 102 according to other policies, such as system management. In this case, the RAN 102 may include the converted location information about the UE 101 in the response message corresponding to operation 412a.

In operations 414-1 and 414-2, the AMF 103 may transfer the location information about the UE 101, obtained in operation 412 or 413, through the GMLC 108, the LCS client 110 which has transmitted the LCS service request in operations 402-1 and 402-4. The location information about the UE 101 may be information whose type has been converted by the AMF 103.

In operation 415, the UE 101 may detect an occurrence of a condition for receiving the location information about the UE 101 received through the message to request to initiate subscription for receiving the location information about the UE 101 in operation 410.

In operation 416, the UE 101 may measure the location of the UE 101.

In operation 417, when connection with the network (according to an embodiment of the disclosure, the core network) is disabled after operation 411, the UE 101 may perform a UE triggered service request procedure.

In operation 418, the UE 101 may inform the LMF 107 that the condition for receiving the location information about the UE 101 requested in operation 410 has occurred.

In operation 419, the LMF 107 may transmit, to the UE 101, a message to acknowledge reception of the report in operation 418.

In operation 420, the LMF 107 may measure and calculate the location of the UE 101 using a similar method to the method described above in connection with operation 409. The location of the UE may be measured and calculated in the type of accuracy of location information about the UE 101.

In operation 421, the LMF 107 may transfer, to the AMF 103, information related to the location of the UE 101 obtained in operation 420.

In operation 422, the AMF 103 may determine whether to be able to continuously receive the network service (e.g., a 5G service) in the location of the UE 101 based on the radio access network technology used by the UE 101 or the location of the UE 101 discussed in connection with operation 405 and the information related to the location of the UE 101 received from the LMF 107 in operation 421.

In operation 423, the AMF 103 may determine whether to convert the information related to the location of the UE 101 received from the LMF 107 in operation 421 into information of a format processable by the UE 101. The location information types processable by the UE 101 may include MCC, cell ID, TAI, country name, or gNB ID. When it is determined that conversion of information type is needed, the AMF 103 may convert the location information about the UE 101 into information in a format processable by the UE 101. According to an embodiment of the disclosure, the AMF 103 may map the country name, GPS location information, GNSS location information, or PLMN ID to correspond to the location information about the UE 101 (cell ID, TAI, GPS location information, GNSS location information, or gNB ID) or MCC and may convert the type of location information about the UE 101 through the mapping information. If it is determined that the information type conversion is not necessary, operation 423 may be omitted.

In operations 424-1 and 424-2, the AMF 103 may transfer the information related to the location of the UE 101, obtained in operation 421 or 423, to the LCS client 110 through the GMLC 108.

In operation 425, the AMF 103 may transfer, to the UE 101, information related to the location of the UE 101 obtained in operation 421 or 423.

In operation 426, the AMF 103 or the UE 101 may initiate a procedure, corresponding to, e.g., a deregistration procedure, a PDU session release procedure, and a service request reject procedure, according to a result of determination of whether it is possible to continuously receive the network service (e.g., a 5G service) in the location of the UE 101 in operation 422.

Figure 5:
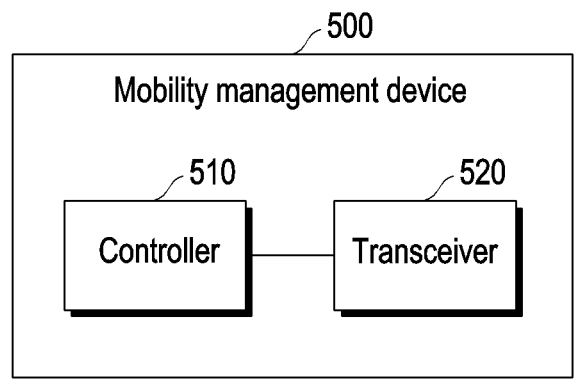
FIG. 5 is a view illustrating a structure of a mobility management device (or mobility management function) according to an embodiment of the disclosure.

FIG. 5 is a view illustrating a structure of a mobility management device (or mobility management function or mobility management entity) according to an embodiment of the disclosure.

Referring to FIG. 5, according to an embodiment of the disclosure, a mobility management device 500 may include at least one controller (e.g., a processor) 510 and a transceiver 520 including a receiver and a transmitter. The mobility management device may include a memory (not shown). The transceiver 520 and the memory may be connected to the at least one controller 510 to be operated under the control of the at least one controller 510.

The at least one controller 510 may control a series of steps to perform the operation of the mobility management device described in connection with the embodiments. The transceiver 520 may transmit and receive signals to/from the UE 600 and another network device (i.e., a location management device 700).

According to an embodiment of the disclosure, the mobility management device 500 may perform the operations of the mobility management device (according to an embodiment of the disclosure, the mobility management device may be the AMF 103 of FIGS. 3 or 4A, 4B, and 4C) according to the embodiments of FIGS. 1 to 3, and 4A, 4B, and 4C.

Figure 6:
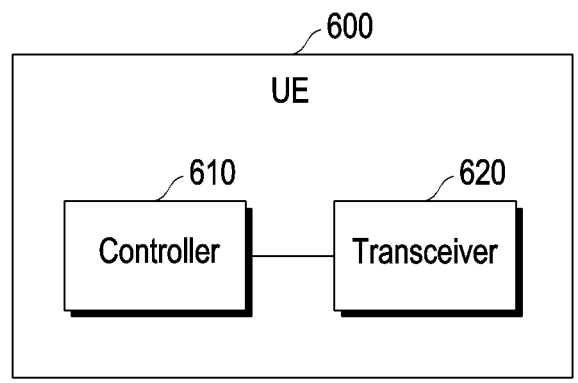
FIG. 6 is a view illustrating an internal structure of a UE according to an embodiment of the disclosure.

FIG. 6 is a view illustrating an internal structure of a UE according to an embodiment of the disclosure.

Referring to FIG. 6, according to an embodiment of the disclosure, a UE 600 may include at least one controller (or a processor) 610 and a transceiver 620 including a receiver and a transmitter. The UE may include a memory (not shown). The transceiver 620 and the memory may be connected to the at least one controller 610 to be operated under the control of the at least one controller 610.

The at least one controller 610 may control a series of steps to perform the operation of the UE described in connection with the embodiments. The transceiver 620 may transmit and receive signals to/from the network device 500 or 700.

According to an embodiment of the disclosure, the UE 600 may perform the operations of the UE (according to an embodiment of the disclosure, the UE may be the UE 101 of FIGS. 1 or 4A, 4B, and 4C) according to the embodiments of FIGS. 1 to 3, and 4A, 4B, and 4C.

Figure 7:
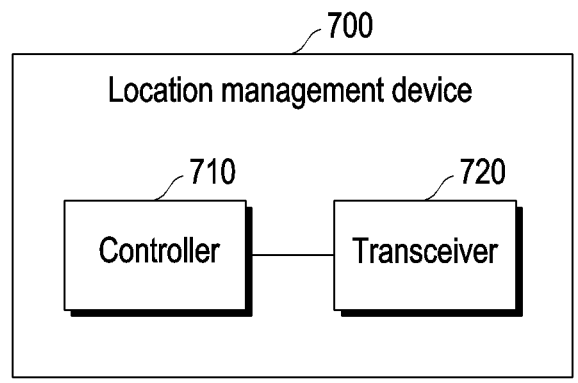
FIG. 7 is a view illustrating an internal structure of a location management device (or location management function) according to an embodiment of the disclosure.

FIG. 7 is a view illustrating an internal structure of a location management device (or location management function or location management entity) according to an embodiment of the disclosure.

Referring to FIG. 7, according to an embodiment of the disclosure, a location management device 700 may include at least one controller (e.g., a processor) 710 and a transceiver 720 including a receiver and a transmitter. The location management device may include a memory (not shown). The transceiver 720 and the memory may be connected to the at least one controller 710 to be operated under the control of the at least one controller 710.

The at least one controller 710 may control a series of steps to perform the operation of the location management device described in connection with the embodiments. The transceiver 720 may transmit and receive signals to/from the UE 600 and another network device 500.

According to an embodiment of the disclosure, the location management device 700 may perform the operations of the location management device (according to an embodiment of the disclosure, the location management device may be the LMF 107 of FIG. 3 or 4A to 4C) according to the embodiments of FIGS. 3, and 4A to 4C.

Figure 8:
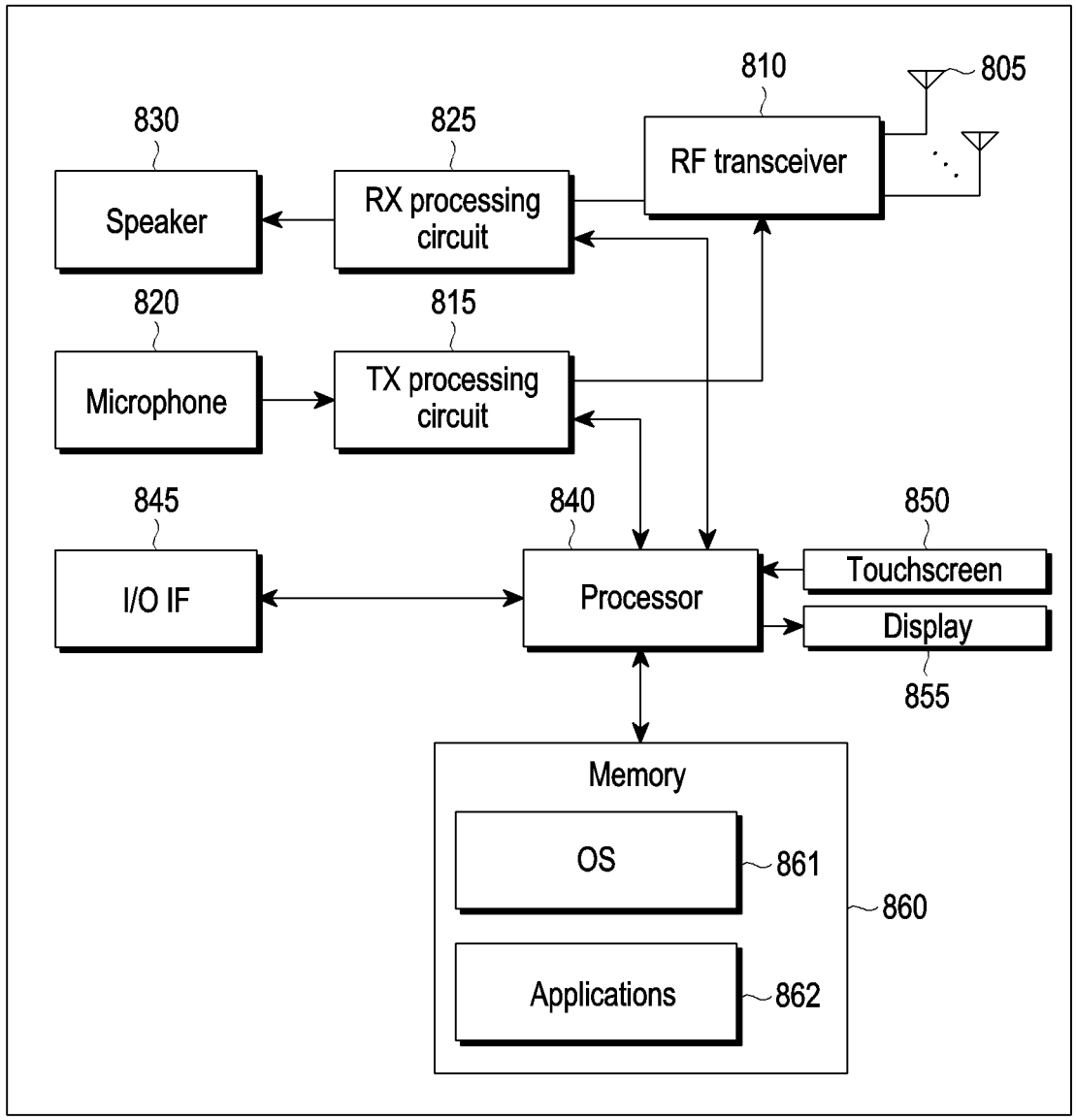
FIG. 8 is a view schematically illustrating an internal structure of a UE in a wireless communication system according to an embodiment of the disclosure.

FIG. 8 is a view schematically illustrating an internal structure of a UE in a wireless communication system according to an embodiment of the disclosure.

The embodiment of the UE illustrated in FIG. 8 is for illustrative purposes only, and the scope of the disclosure is not limited thereto.

Referring to FIG. 8, the UE may include an antenna 805, a radio frequency (RF) transceiver 810, a transmission (TX) processing circuit 815, a microphone 820, and a reception (RX) processing circuit 825. The UE further includes a speaker 830, a processor (controller) 840, an input/output (I/O) interface (IF) 845, a touch screen 850, a display 855, and a memory 860. The memory 860 includes an operating system (OS) 861 and one or more applications 862.

The RF transceiver 810 receives an input RF signal transmitted from a base station in a network, via the antenna 805. The RF transceiver 810 down-converts the input RF signal, generating an intermediate frequency (IF) or baseband signal. The IF or baseband signal is transmitted to the RX processing circuit 825, and the RX processing circuit 825 filters, decodes, and/or digitizes the baseband or IF signal, generating a processed baseband signal. The RX processing circuit 825 sends the processed baseband signal to the speaker 830 (e.g., as for audio data) or the processor 840 (e.g., as for web browsing data) for further processing.

The TX processing circuit 815 receives analog or digital speech data from the microphone 820 or other output baseband data (e.g., web data, emails, or interactive video game data) from the processor 840. The TX processing circuit 815 encodes, multiplexes, and/or digitizes the output baseband data, generating a processed baseband or IF signal. The RF transceiver 810 receives the processed baseband or IF signal output from the TX processing circuit 815 and up-converts the baseband or IF signal into an RF signal which is to be transmitted through the antenna 805.

The processor 840 may include one or more processors or other processing devices, and may execute the OS 861 stored in the memory 860 to control the overall operation of the UE. As an example, the processor 840 may control reception of downlink channel signals and transmission of uplink channel signals by the RF transceiver 810, the RF processing circuit 825, and the TX processing circuit 815 according to known principles. According to an embodiment of the disclosure, the processor 840 includes at least one microprocessor or microcontroller.

In various embodiments of the disclosure, the processor 840 may control the overall operation related to the operation of identifying the service area and UE network registration. In other words, the processor 840 may control the overall operation for the operation of identifying the service area and network registration as described with reference to FIGS. 1 to 3, 4A, 4B, 4C, and 5 to 7, as an example.

The processor 840 may move data into or out of the memory 860 as required by a running process. According to an embodiment of the disclosure, the processor 840 is configured to execute the applications 862 based on the OS program 861 or in response to signals received from base stations or the operator. The processor 840 is coupled to the I/O interface 845, and the I/O interface 845 provides the UE with connectibility to other devices, e.g., laptop computers and handheld computers. The I/O interface 845 is a communication path between these accessories and the processor 840.

The processor 840 is connected to the touch screen 850 and the display unit 855. The operator of the UE may input data into the UE using the touch screen 850. The display 855 may be a liquid crystal display, a light emitting diode display, or other displays capable of rendering text and/or at least limited graphics, such as from websites.

The memory 860 is connected to the processor 840. A portion of the memory 860 may include a random access memory (RAM), and the remainder of the memory 860 may include a flash memory or a read-only memory (ROM).

Although FIG. 8 illustrates an example UE, various changes may be made thereto. For example, various components of FIG. 8 may be combined together, each component may be further divided, or some components may be omitted, or other components may be added as necessary. As an example, the processor 840 may be divided into multiple processors, such as one or more central processing units (CPUs) and one or more graphics processing units (GPUs). Although the UE is configured like a mobile phone or a smart phone in FIG. 8, the UE may be configured to operate as a different type of mobile or stationary device.

Figure 9:
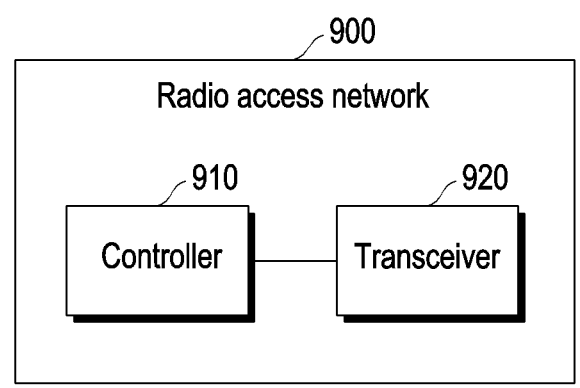
FIG. 9 is a view illustrating an internal structure of a radio access network (RAN) according to an embodiment of the disclosure.

FIG. 9 is a view illustrating an internal structure of a radio access network (RAN) (or base station) according to an embodiment of the disclosure.

Referring to FIG. 9, according to an embodiment of the disclosure, a radio access network 900 may include at least one controller (e.g., a processor) 910 and a transceiver 920 including a receiver and a transmitter. The radio access network may include a memory (not shown). The transceiver 920 and the memory may be connected to the at least one controller 910 to be operated under the control of the at least one controller 910.

The at least one controller 910 may control a series of steps to perform the operation of the radio access network described in connection with the embodiments. The transceiver 920 may transmit and receive signals to/from the UE 600, the mobility management device 500, and the location management device 700.

According to an embodiment of the disclosure, the radio access network 900 may perform the operations of the radio access network (according to an embodiment of the disclosure, the radio access network may be the RAN 102 of FIGS. 3 or 4A, 4B, and 4C) according to the embodiments of FIGS. 3, and 4A, 4B, and 4C.

While the disclosure has been shown and described with reference to various embodiments thereof, it will be understood by those skilled in the art that various changes in form and details may be made therein without departing from the spirit and scope of the disclosure as defined by the appended claims and their equivalents.

In accordance with an aspect of the disclosure, a mobility management entity in a wireless communication system, the mobility management entity comprising: a transceiver; and at least one processor configured to control the transceiver; wherein the at least one processor is configured to: receive, from a base station, a first message including first information related to a location of a user equipment (UE), in case that the mobility management entity is not possible to determine whether the location of the UE is included in an area served by the mobility management entity based on the first information, transmit, to a location management entity, a second message including a parameter associated with the location of the UE, and receive, from the location management entity, third message including second information indicating an area where the UE belongs, determined based on the parameter.

In addition, wherein the at least one processor is further configured to: in case that the area where the UE belongs is not included in the area served by the mobility management entity, transmit, to the UE, a reject message including third information indicating the area where the UE belongs, based on the second information in response to the first message.

In addition, wherein the reject message includes information indicating that the area where the UE belongs is not included in the area served by the mobility management entity.

In addition, wherein the area where the UE belongs includes at least one of a country that the UE belongs or an international area that the UE belongs.

In addition, wherein the parameter includes information indicating to map the location of the UE to the country or the international area that the UE belongs.

In addition, wherein the third message comprises the location of the UE.

In addition, wherein the parameter includes information on at least one of a mobile country code (MCC), a country name, global positioning system (GPS) location information, global navigation satellite system (GNSS) location information, or a public land mobile network (PLMN) identification (ID).

In accordance with another aspect of the disclosure, A location management entity in a wireless communication system, the location management entity comprising: a transceiver; and at least one processor configured to control the transceiver; wherein the at least one processor is configured to: receive, from a mobility management entity, first message including a parameter associated with a location of a user equipment (UE), map the location of the UE to an area where the UE belongs based on the parameter, and transmit, to the mobility management entity, second message including information indicating the area where the UE belongs.

In addition, wherein the area where the UE belongs includes at least one of a country that the UE belongs or an international area that the UE belongs.

In addition, wherein the parameter includes information indicating to map the location of the UE to the country or the international area that the UE belongs.

What is claimed is:

1. A mobility management entity in a wireless communication system, the mobility management entity comprising:
    a transceiver; and
    at least one processor configured to control the transceiver;
    wherein the at least one processor is configured to:
        receive, from a base station, a first message including first information related to a location of a user equipment (UE),
        in case that the mobility management entity is not possible to determine whether the location of the UE is included in an area served by the mobility management entity based on the first information,
            transmit, to a location management entity, a second message including a parameter associated with the location of the UE, and
            receive, from the location management entity, third message including second information indicating an area where the UE belongs, determined based on the parameter.

2. The mobility management entity of claim 1, wherein the at least one processor is further configured to:
    in case that the area where the UE belongs is not included in the area served by the mobility management entity, transmit, to the UE, a reject message including third information indicating the area where the UE belongs, based on the second information in response to the first message.

3. The mobility management entity of claim 2,
    wherein the reject message includes information indicating that the area where the UE belongs is not included in the area served by the mobility management entity.

4. The mobility management entity of claim 1,
    wherein the area where the UE belongs includes at least one of a country that the UE belongs or an international area that the UE belongs.

5. The mobility management entity of claim 1,
    wherein the parameter includes information indicating to map the location of the UE to a country or an international area that the UE belongs.

6. The mobility management entity of claim 1,
    wherein the third message comprises the location of the UE.

7. The mobility management entity of claim 1,
    wherein the parameter includes information on at least one of a mobile country code (MCC), a country name, global positioning system (GPS) location information, global navigation satellite system (GNSS) location information, or a public land mobile network (PLMN) identification (ID).

8. A location management entity in a wireless communication system, the location management entity comprising:
    a transceiver; and
    at least one processor configured to control the transceiver;
    wherein the at least one processor is configured to:
        receive, from a mobility management entity, first message including a parameter associated with a location of a user equipment (UE),
        map the location of the UE to an area where the UE belongs based on the parameter, and
        transmit, to the mobility management entity, second message including information indicating the area where the UE belongs.

9. The location management entity of claim 8,
    wherein the area where the UE belongs includes at least one of a country that the UE belongs or an international area that the UE belongs.

10. The location management entity of claim 8,
    wherein the parameter includes information indicating to map the location of the UE to a country or an international area that the UE belongs.

11. A method performed by a mobility management entity in a wireless communication system, the method comprising:
    receiving, from a base station, a first message including first information related to a location of a user equipment (UE);
    in case that the mobility management entity is not possible to determine whether the location of the UE is included in an area served by the mobility management entity based on the first information,
        transmitting, to a location management entity, a second message including a parameter associated with the location of the UE; and
        receiving, from the location management entity, third message including second information indicating an area where the UE belongs, determined based on the parameter.

12. The method of claim 11, further comprising:
    in case that the area where the UE belongs is not included in the area served by the mobility management entity, transmitting, to the UE, a reject message including third information indicating the area where the UE belongs, based on the second information.

13. The method of claim 12,
wherein the reject message includes information indicating that the area where the UE belongs is not included in the area served by the mobility management entity.

14. The method of claim 11,
wherein the area where the UE belongs includes at least one of a country that the UE belongs or an international area that the UE belongs.

15. The method of claim 11,
wherein the parameter includes information indicating to map the location of the UE to a country or an international area that the UE belongs.

16. The method of claim 11,
wherein the third message comprises the location of the UE.

17. The method of claim 11,
wherein the parameter includes information on at least one of a mobile country code (MCC), a country name, global positioning system (GPS) location information, global navigation satellite system (GNSS) location information, or a public land mobile network (PLMN) identification (ID).

18. A method performed by a location management entity in a wireless communication system, the method comprising:
receiving, from a mobility management entity, first message including a parameter associated with a location of a user equipment (UE);
mapping the location of the UE to an area where the UE belongs based on the parameter; and
transmitting, to the mobility management entity, second message including information indicating the area where the UE belongs.

19. The method of claim 18,
wherein the area where the UE belongs includes at least one of a country that the UE belongs or an international area that the UE belongs.

20. The method of claim 18,
wherein the parameter includes information indicating to map the location of the UE to a country or an international area that the UE belongs.

* * * * *